Figure 1:
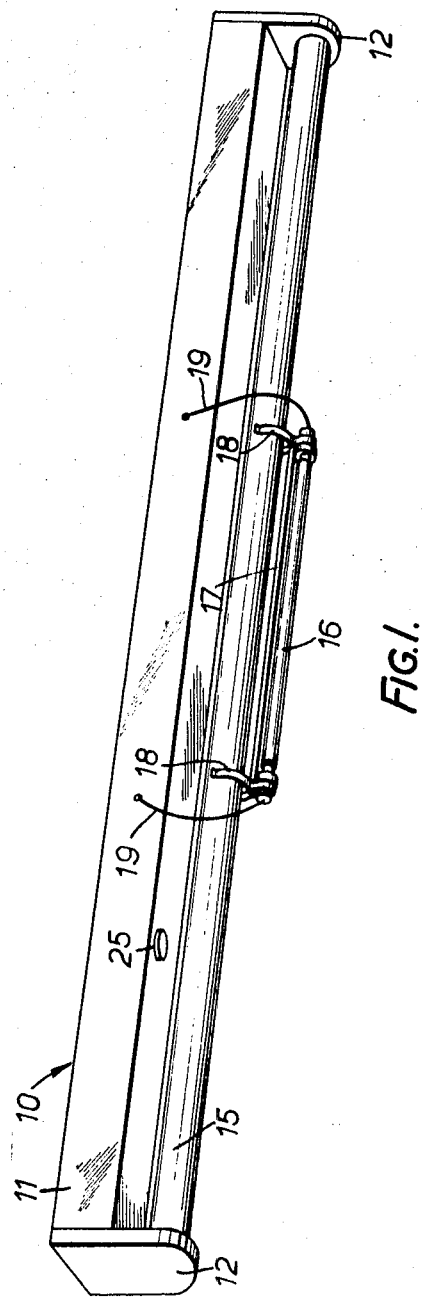

United States Patent
Barker et al.

[15] 3,659,179
[45] Apr. 25, 1972

[54] EMERGENCY ELECTRIC LIGHTING UNITS

[72] Inventors: John S. N. Barker; Ronald H. Minter, both of Hants, England

[73] Assignee: Bardic Systems Limited, Northam, Southampton, Hampshire, England

[22] Filed: June 10, 1970

[21] Appl. No.: 45,175

[30] Foreign Application Priority Data

June 11, 1969 Great Britain.....................29,656/69

[52] U.S. Cl..............................320/2, 240/37.1, 240/51.11
[51] Int. Cl. ......................................F21v 19/04, H05b 33/02
[58] Field of Search ................307/66; 240/37.1, 51.11, 1.3; 320/DIG. 1, 21, 2

[56] References Cited

UNITED STATES PATENTS

| | | | |
|---|---|---|---|
| 1,946,570 | 2/1934 | Beidler | 240/37.1 |
| 3,336,472 | 8/1967 | Steinig | 240/37.1 |
| 3,308,306 | 3/1967 | Bagno | 320/DIG. 1 |
| 3,336,473 | 8/1967 | Buzan | 240/37.1 |
| 2,880,372 | 3/1959 | Greppin | 307/66 X |
| 3,387,141 | 6/1968 | Howald | 307/66 X |
| 3,356,891 | 12/1967 | Godard | 307/66 X |
| 2,978,596 | 4/1961 | Robirds | 307/66 X |
| 3,247,368 | 4/1966 | McHugh | 240/51.11 |

Primary Examiner—J. D. Miller
Assistant Examiner—Robert J. Hickey
Attorney—Watson, Cole, Grindle & Watson

[57] ABSTRACT

An electric lighting unit incorporates a main fluorescent lamp which is normally illuminated from an A.C. supply as well as an auxiliary emergency fluorescent lamp which is automatically switched on if the supply should fail. The unit has the usual base which contains not only the auxiliary equipment for the main lamp but also a rechargeable battery, incorporated in an encapsulated unit, and, incorporated in another encapsulated unit, a charger for normally trickle-charging the battery from the A.C. supply, a solid-state inverter, and a solid-state switching device responsive to failure of the A.C. supply to switch on the inverter to illuminate the auxiliary lamp from the battery. The auxiliary lamp is supported by the main lamp.

5 Claims, 3 Drawing Figures

Patented April 25, 1972

3,659,179

2 Sheets-Sheet 1

INVENTORS
JOHN SCOTT NETHERWOOD BARKER
RONALD HENRY MINTER

BY
Watson, Cole, Grindle & Watson
ATTORNEY ated by the main lamp. # EMERGENCY ELECTRIC LIGHTING UNITS This invention relates to emergency electric lighting systems.

According to the present invention an emergency electric lighting unit includes a rechargeable battery, a charger for normally trickle charging the battery from an A.C. supply, an emergency fluorescent lamp, a solid-state inverter, and a solid-state switching device responsive to failure of the A.C. supply to switch on the inverter to illuminate the auxiliary lamp from the battery.

The switching device may also cut off the current taken by the inverter if the battery voltage is below a predetermined value.

In a preferred form of the invention the battery, the charger, the inverter, and the switching device are constructed to be accommodated in the vacant space in the base of a main fluorescent lamp operated from an A.C. supply.

Thus according to a further aspect of the invention an electric lighting unit incorporates a main fluorescent lamp, auxiliary equipment for illuminating the lamp from A.C. supply terminals, a base in the form of an elongated box carrying the main lamp and accommodating the auxiliary equipment, an auxiliary emergency fluorescent lamp, and also accommodated within the base, a rechargeable battery, a charger for normally trickle charging the battery from A.C. supply terminals, a solid-state inverter, and a solid state switching device responsive to failure of the A.C. supply to switch on the inverter to illuminate the auxiliary lamp from the battery.

The rechargeable battery may comprise a plurality of cells in the form of a single encapsulated unit, while the charger, the inverter and the switching device may be provided in the form of a second encapsulated unit, the two units being adapted to be accommodated in the vacant space in the base of an electric fluorescent lamp intended for normal mains operation.

The emergency fluorescent lamp may be adapted to be mounted adjacent the mains operated lamp, either supported therefrom or from a part of the fitting.

Figure 2:
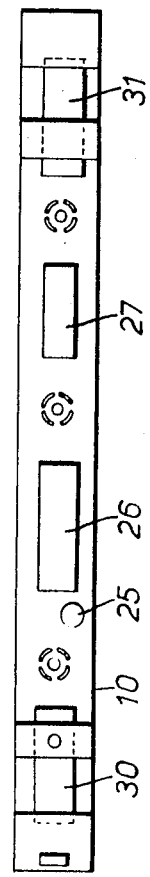
Figure 3:
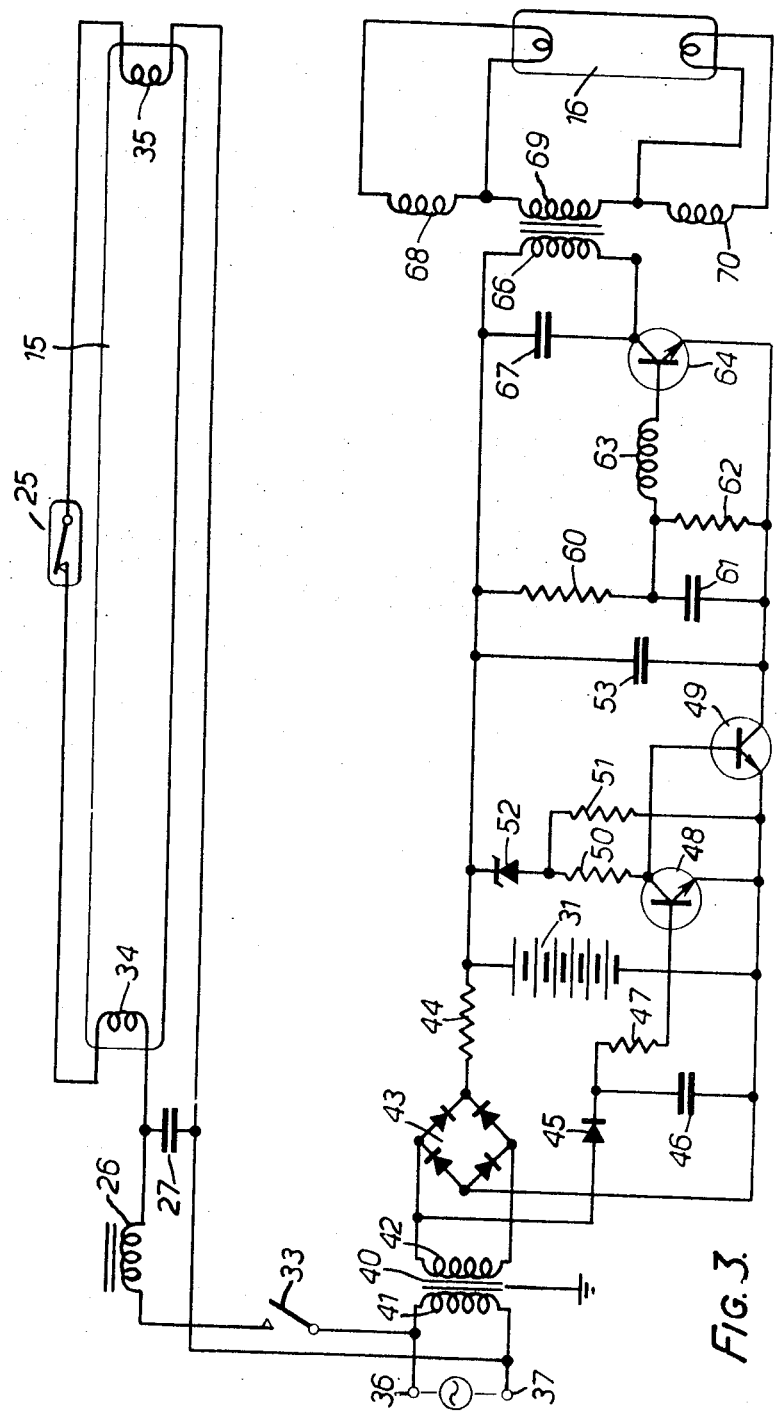

Further features and details of the invention will be apparent from the following description of one specific embodiment, which will be given by way of example, with reference to the accompanying drawings, in which:

FIG. 1 is a perspective view of an electric lighting unit incorporating a main fluorescent lamp and an auxiliary emergency fluorescent lamp, FIG. 2 is a plan view of the base of the lamp showing the auxiliary equipment in it, and FIG. 3 is a circuit diagram.

The electric lighting unit may be based on any conventional form of fluorescent lighting unit for operating from A.C. mains supply, of which many types are available.

In the embodiment shown the unit comprises a base 10 in the form of an elongated rectangular box closed by a flat cover 11. At each end it carries a depending lug 12 incorporating a socket to receive the terminals (usually pins) at one end of a main tubular fluorescent lamp 15.

The main lamp 15 serves to support an auxiliary emergency fluorescent lamp 16 carried by a base 17 suspended by clips 18 from the main lamp. The terminals of the auxiliary lamp are connected by flexible leads 19 to the components, referred to below, within the base 10.

In a modified form of installation in which the main lamp is provided with a diffuser the auxiliary lamp may be mounted in the diffuser.

As shown in FIG. 2 the base 10 contains conventional auxiliary equipment for the main lamp comprising a starter 25, a ballast or choke unit 26 and a phase correcting capacitor 27.

In addition, for the purposes of the present invention it includes two further encapsulated units, a unit 30 incorporating a charger, a solid-state inverter, and a solid-state switching unit, and a unit 31 incorporating a rechargeable battery of six sealed alkaline cells. Each of these units forms a single encapsulated block in a small rectangular casing some 6 inches to 7 inches long and 1½ inches square.

The connections of the main lamp may be arranged in any conventional or preferred manner but in the embodiment shown in FIG. 3 one terminal of one of its heater filaments 34 is connected through the ballast choke 26 and a manual switch 33 to the line terminal 36 of an A.C. supply, and one terminal of the other heater filament 35 is connected directly to the neutral supply terminal 37. The phase correction capacitor 27 is connected between these two heater terminals. The other two heater terminals are connected together through the starter switch 25 which may be of cold cathode or any other preferred type.

The emergency lighting unit incorporates a supply transformer 40 having a primary winding 41 connected to the supply terminals 36, 37 (on the supply side of the switch 33) and a secondary winding 42 connected to the input of a bridge rectifier 43 whereof the output is connected through a resistor 44 to the terminals of the battery 31 as normally to charge the battery when the unit is connected to a live supply. In addition one arm of the rectifier bridge is connected through a diode 45 to a capacitor 46 so as to charge the capacitor whenever the supply is live. The terminals of the capacitor are connected through a resistor 47 between the emitter and base of a first switching transistor 48 whereof the emitter and collector are connected respectively to the emitter and base of a second transistor 49. Both these transistors are of germanium type having low forward drop. The base of the second transistor 49 is also connected through a small resistor 50 to the junction of a potential divider comprising a resistor 51 and a zener diode 52 connected across the battery terminals. The collector of the second transistor 49, and the positive battery terminal, are respectively connected to the terminals of a supply capacitor 53 forming the input to an inverter circuit.

Accordingly in normal operation the secondary winding 42 of the transformer on the one hand trickle charges the battery as already referred to, and on the other hand maintains a current in the base circuit of the first transistor 48 so as to keep that transistor conducting. Accordingly it forms virtually a short circuit between the emitter and base of the second transistor 49 which remains cut off so as not to connect the battery to the inverter. If the supply should fail, the current in the base circuit of the first transistor will cease, that transistor will cut off, and the potential difference across it will pass a current through the base circuit of the second transistor 49 causing it to conduct and connect the inverter input to the battery.

Due to the arrangement of the zener diode 52 this transistor also performs another function. Thus if the battery voltage falls below that required to cause the zener diode to conduct the voltage across the resistor of the potential divider collapses and again the second transistor wholly or partly cuts off, so as to prevent a cell of the battery from being over discharged and being driven in reverse by the other cells.

The inverter comprises a resistor/capacitor network connected across the supply capacitor 53 referred to above and comprising a resistor 60 and a capacitor 61 shunted by a resistor 62, with the junction connected through an inductor 63 to the base of an inverter transistor 64. The emitter is connected to the negative supply terminal and the collector is connected to the positive supply terminal through the primary winding 66 of a transformer shunted by a capacitor 67. The transformer has three secondary windings 68, 69 and 70 of which the first and third are connected respectively to terminals for the heaters of the small emergency fluorescent lamp 16, for example consuming 8 or 13 watts.

The invention provides a convenient and compact emergency lighting system which can be applied to a wide variety of existing or new mains-operated lighting fittings. By utilizing the existing space in such fittings, the system takes up no additional space and presents no appearance design problems.

The use of a fluorescent tube type of lamp gives a gain in light output for a given current, while the separation of the battery from the electronic circuit assists in reducing the temperature problems which can arise in sealed fittings. The battery may comprise six cells each of 1.2 ampere/hours capacity, which will be charged initially at 60 milliamperes settling down to 45 milliamperes after about half an hour from the discharged condition.

WHAT WE claim as our invention and desire to secure by Letters Patent is:

1. An electric lighting unit comprising; a main fluorescent lamp, means for illuminating said lamp from A.C. supply terminals, auxiliary equipment a base in the form of an elongated box carrying the main lamp and accommodating the auxiliary equipment, said auxiliary equipment comprising, an auxiliary emergency fluorescent lamp, a rechargeable battery, a charger for normally trickle charging the battery from said A.C. supply terminals, a solid-state inverter connected between said battery and said auxiliary lamp, and a solid-state switching device responsive to failure of the A.C. supply to switch on the inverter to illuminate the auxiliary lamp from the battery, said auxiliary lamp being supported by and depending from said main lamp.

2. A lighting unit as claimed in claim 1 in which the rechargeable battery comprises a plurality of cells in the form of a single encapsulated unit.

3. A lighting unit as claimed in claim 1 in which the charger, the inverter and the switching device are incorporated in a single encapsulated unit.

4. A unit as claimed in claim 1 in which the switching device also cuts off the current taken by said inverter with the battery voltage below a predetermined value.

5. A lighting unit as claimed in claim 1 in which the main fluorescent lamp is substantially more powerful than the auxiliary emergency fluorescent lamp.

* * * * *